United States Patent [19]

Kaser et al.

[11] 4,032,984

[45] June 28, 1977

[54] TRANSDUCER POSITIONING SYSTEM FOR PROVIDING BOTH COARSE AND FINE POSITIONING

[75] Inventors: Jon Bruce Kaser, Thousand Oaks; John Lawrence Von Feldt, Simi Valley; Ivan Earl Walenta, Westlake Village, all of Calif.

[73] Assignee: Burroughs Corporation, Detroit, Mich.

[22] Filed: Apr. 28, 1975

[21] Appl. No.: 572,304

[52] U.S. Cl. .................................. 360/77; 360/135
[51] Int. Cl.² ..................... G11B 21/10; G11B 5/82
[58] Field of Search ................ 360/77, 72, 75, 78, 360/131, 135, 27

[56] References Cited

UNITED STATES PATENTS

| 3,034,111 | 5/1962 | Hoagland et al. .................. 360/77 |
| 3,479,664 | 11/1969 | Stuart-Williams et al. ........... 360/77 |

Primary Examiner—Alfred H. Eddleman

Attorney, Agent, or Firm—Nathan Cass; Kevin R. Peterson; Edward J. Feeney, Jr.

[57] ABSTRACT

Method and apparatus for providing coarse and fine radial positioning of a transducer relative to the concentric tracks of a rotatable magnetic disc having work data and servo data interspersed in alternate sectors on the disc. The servo data sectors comprise repeating groups of servo tracks which are used in providing coarse and fine radial positioning of the transducer relative to work data tracks provided in the work data sectors. In a preferred embodiment, each servo track is provided with specially encoded servo data comprising a common reference transition followed by spaced fine servo positioning data and coarse servo positioning data which are individually chosen in a manner so as to permit each to reliably perform its respective fine or coarse positioning function without significantly increasing the storage area required for recording the servo data.

23 Claims, 10 Drawing Figures

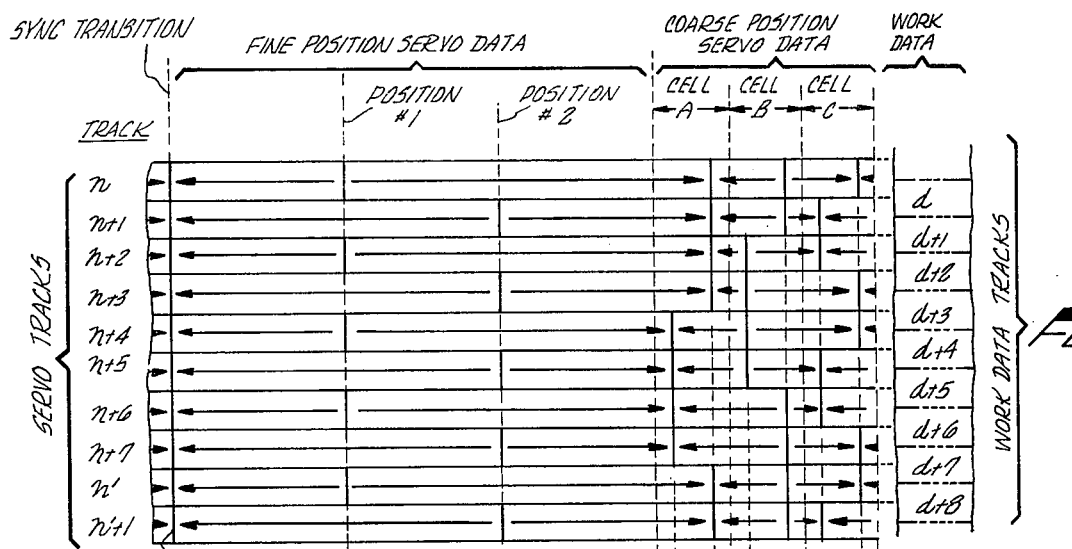
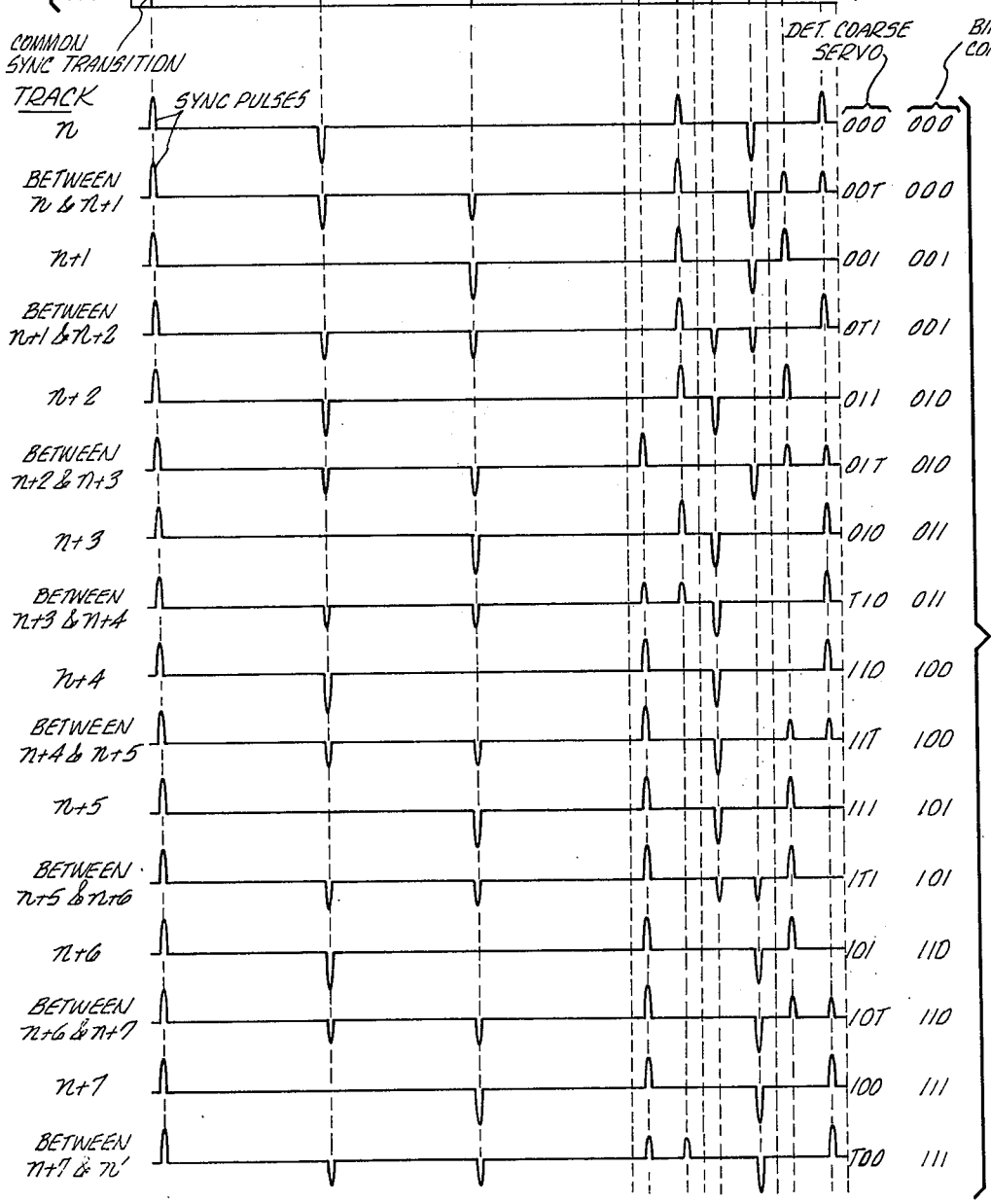

| TRACK POSITION | ENCODE | | DECODE | |
|---|---|---|---|---|
| | BINARY CODE | GRAY CODE CONVERSION | DETECTED COARSE SERVO | BINARY CODE CONVERSION |
| n | 000 | 000 | 000 | 000 |
| betw n & n+1 | | | 00T | 000 |
| n+1 | 001 | 001 | 001 | 001 |
| betw n+1 & n+2 | | | 0T1 | 001 |
| n+2 | 010 | 011 | 011 | 010 |
| betw n+2 & n+3 | | | 01T | 010 |
| n+3 | 011 | 010 | 010 | 011 |
| betw n+3 & n+4 | | | T10 | 011 |
| n+4 | 100 | 110 | 110 | 100 |
| betw n+4 & n+5 | | | 11T | 100 |
| n+5 | 101 | 111 | 111 | 101 |
| betw n+5 & n+6 | | | 1T1 | 101 |
| n+6 | 110 | 101 | 101 | 110 |
| betw n+6 & n+7 | | | 10T | 110 |
| n+7 | 111 | 100 | 100 | 111 |
| betw n+7 & n' | | | T00 | 111 |
| n' | 000 | 000 | 000 | 000 |
_FIG. 6_
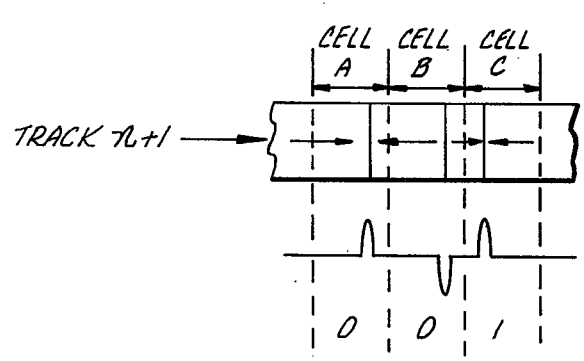
_FIG. 5_

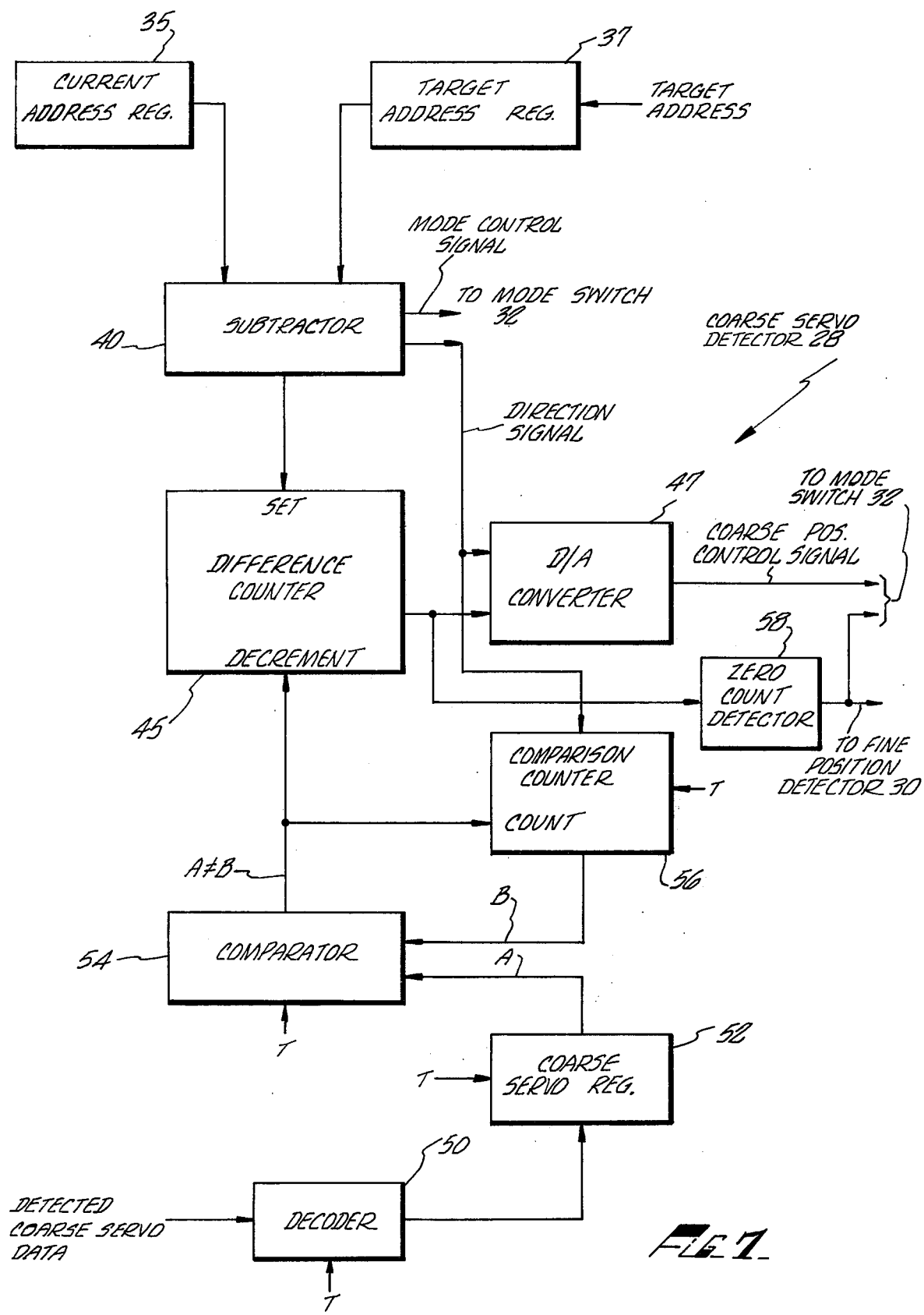

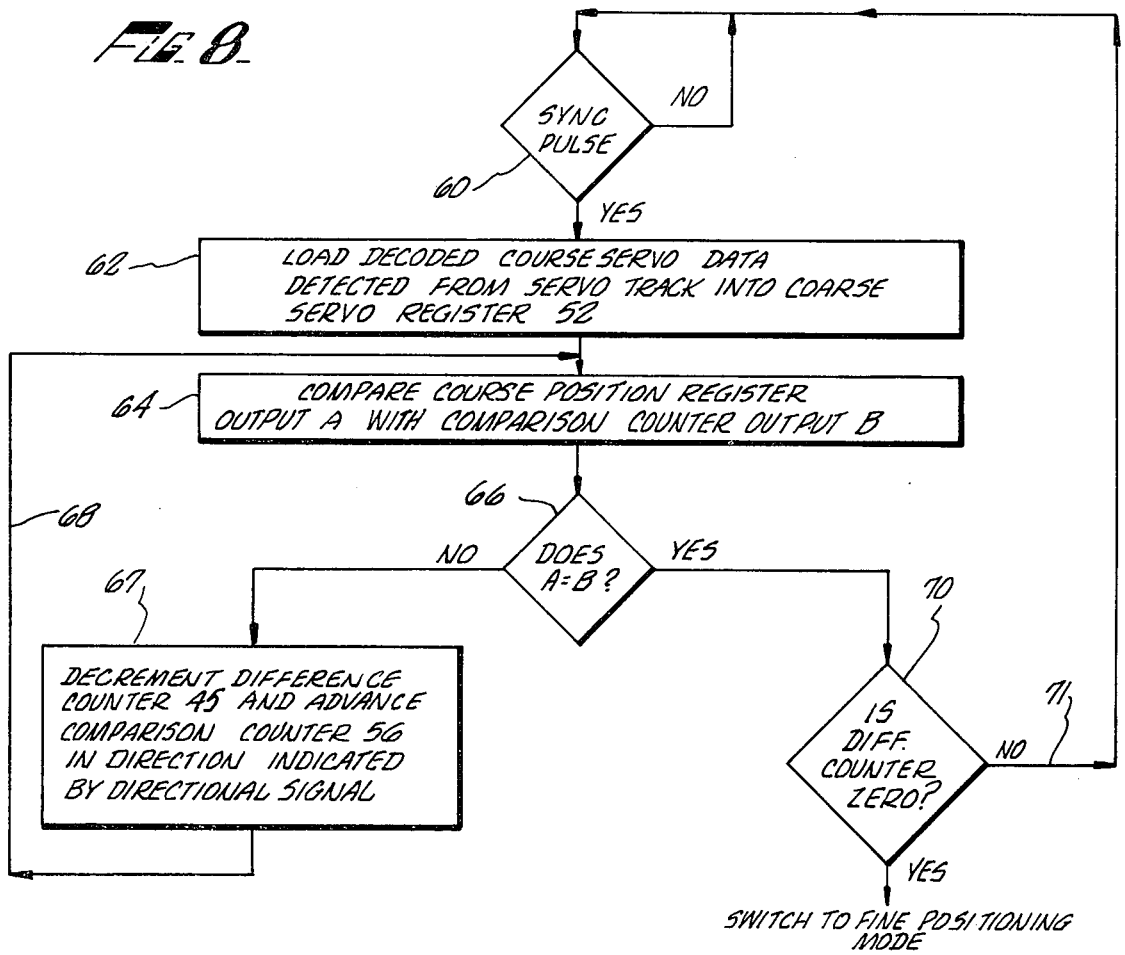

TRANSDUCER POSITIONING SYSTEM FOR PROVIDING BOTH COARSE AND FINE POSITIONING

BACKGROUND OF THE INVENTION

The present invention relates generally to information recording and/or reproducing systems, and more particularly to improved means and methods for positioning a transducer relative to a moving medium.

The following United States patents are of interest with respect to transducer positioning systems:
U.S. Pat. No. 3,491,347 to Farrand
U.S. Pat. No. 3,691,543 to Mueller
U.S. Pat. No. 3,686,649 to Behr
U.S. Pat. No. 3,699,555 to Du Vall
U.S. Pat. No. 3,812,533 to Kimura et al. and
U.S. Pat. No. 3,838,457 to Palmer.

The following article is also of interest: "Design of a Disk File Head-Positioning Servo," R. K. Oswald, IBM Journal of Research and Development, November 1974.

Reference is also made to the related commonly assigned patent application Ser. No. 572,303, filed Apr. 28, 1975, for TRANSDUCER POSITIONING SYSTEM, R. S. Kril, inventor.

A common type of device to which the present invention may be applied is a magnetic disc recording and reproducing system employing one or more read/write heads as transducers. Such a system is typically employed for providing auxiliary storage in a data processing system. In such a system, data is recorded on a disc in a plurality of concentric circumferential tracks. Data located in a particular track of a disc is read by properly positioning the read/write head in a radial direction so as to be located directly over the desired track. The radial positioning operation of the head typically involves two steps: (1) a wide range coarse positioning step (also referred to as track seeking) for moving the head to a radial position within the immediate proximity of a desired target track, and (2) a fine positioning a step for bringing the head into accurate alignment with the target track and for maintaining this alignment (also referred to as track following) until it is desired that the transducer be repositioned to a new track.

As will be evident from the aforementioned patents and article (e.g. see U.S. Pat. Nos. 3,691,543; 3,812,533; and 3,838,457 and the aforementioned article), fine positioning is usually achieved by controlling the head positioning carriage in response to the detection of pre-recorded encoded servo data using either the same head as is used to read the work data, or a special servo head. The servo data may be recorded on the same disc as the work data or on a separate disc or surface having a precise mechanical relationship thereto. Coarse positioning is typically achieved in two common ways: (1) by controlling radial head movement based on detection of the movement of the head positioning carriage, such as by employing photoelectric detection means (e.g. see U.S. Pat. No. 3,812,533), or (2) by controlling radial head movement based on detecting track crossings using the recorded servo data provided for fine positioning purposes (e.g. see U.S. Pat. Nos. 3,691,543, and 3,838,457).

The latter of the above two coarse positioning approaches employing the fine positioning servo data for coarse positioning detection is to be preferred in many applications, since it does not rely on establishing and maintaining a precise relationship between movement of the carriage and the head. However, a problem arises in providing coarse positioning in this preferred manner in systems in which the servo data is interspersed on the same disc as the work data, such as where the work data and the servo data are arranged in alternating sectors on the disc, as is commonly done. The problem arises because of the possibility of the head crossing a plurality of tracks between servo sectors during coarse positioning, which is normally to be expected in high density systems. In order to accurately count track crossings in such a situatio, known systems have had to expand the capabilities of the recorded fine positioning servo data to permit uniquely identifying a group of adjacent tracks rather than just two tracks, the number of tracks in the group being at least equal to the maximum number of tracks which may be crossed by a head between servo sectors. While this expansion of the recorded fine positioning servo data solves the problem, it has the significant disadvantage of requiring a relatively large portion of the disc surface for its implementation because of the need to maintain the integrity of its fine positioning capabilities in the expanded form.

Even in those applications in which servo data is recorded on a separate disc or on a separate disc surface (e.g. a duel layer disc), it is still desirable to provide for uniquely identifying a group of tracks to permit electrically off-setting the servo head as may be required to bring the work data head into exact registration with a work data track. The need for this capability occurs, for example, when one device is used to record data on a disc, and the disc is then physically removed and stored for eventual mounting on a second device which might provide a slightly different spacing between the work data and servo data heads than existed on the first device. As pointed out above, the expansion of the conventional recorded fine positioning servo data to permit unique identification of a plurality of tracks would likewise require a relatively large track storage area.

Summary of the Invention

Briefly, the present invention is directed to improved means and methods for positioning a transducer with respect to a relatively moving recording medium, using a specially chosen servo encoding pattern for providing coarse and fine positioning of a head relative to a plurality of tracks provided on the medium. In a preferred embodiment, each servo track contains a common reference transition followed by two types of servo data: (1) fine servo data for providing fine positioning and track following with respect to two adjacent tracks, and (2) coarse servo data for providing coarse positioning as well as intermediate positioning of the transducer. The segregation of the coarse servo data from the fine servo data permits each to be tailored for its own special purpose. As a result, the coarse servo data is advantageously provided in highly compact from using a particularly advantageous encoding pattern which requires only a relatively small additional amount of storage area in order to provide for the unique identification of a relatively large number of tracks for coarse positioning as well as for intermediate positioning of the transducer, as compared to the additional storage area that would be required if an expanded form of the fine positioning servo data were to be used for this purpose.

In the preferred embodiment of the invention, the fine servo data recorded in the servo tracks is of the type disclosed in FIGS. 1-5 of the aforementioned Mueller U.S. Pat. No. 3,691,543. The provision of such fine servo data in a servo track involves the recording of a common reference transition for all servo tracks followed by an opposite polarity transition at either a first or second position of each track, depending upon whether the track is odd or even, thereby providing differently located transitions on adjacent tracks. For fine positioning control, the resulting detected pulses derived from the differently positioned transitions on adjacent tracks are appropriately separated using a sync pulse produced in response to the common reference transition, the pulse amplitudes then being compared to provide a fine positioning control signal dependent upon the position of the transducer relative to the pair of adjacent tracks over which the transducer is currently located.

In the preferred embodiment, the coarse servo data is provided following the fine servo data and employs the common reference transition for timing purposes. The coarse servo data in each servo track is provided as a plurality of cells, each cell containing a single magnetic transition representing a single binary digit, 0 or 1, dependent upon whether the magnetic transition occurs in the first or second half of the cell. The number of tracks in a group which can be uniquely encoded in this manner is equal to $2^N$ where N is the number of cells provided in each track. Thus, the provision of three cells in each track, as in the preferred embodiment described herein, permits the unique identification of eight tracks. Particular advantage is taken of this coarse servo encoding pattern in the preferred embodiment by employing a specially chosen sequence, such as a Gray code sequence, for encoding each group of uniquely identifiable tracks. The important characteristic in this regard is that a sequence be chosen which requires a change in the magnetic transition location of only one cell between adjacent tracks. Such a choice advantageously permits highly reliable digital detection of transducer position relative to each group of uniquely identifiable tracks, since movement of the transducer from one track to an adjacent track will cause the resulting detected signals to change for only one cell position, the detected signals for the other cell positions remaining the same regardless of whether the head is located over either of the adjacent tracks or at any intermediate position therebetween. Furthermore, for the particular cell which changes between adjacent tracks, the between-track condition is readily detectable, since a between-track condition will result in detected pulses being obtained in both the first and second portions of the changed cell position. Since this coarse servo encoding pattern merely requires the detection of the presence or absence of pulses at predetermined cell locations, it will be understood that the cells can be compactly provided in each track.

BRIEF DESCRIPTION OF THE DRAWINGS

The foregoing and other objects, features, advantages and uses of the invention will become apparent from the following description of preferred embodiments taken in conjunction with the accompanying drawings in which:

FIG. 3 illustrates a preferred servo data encoding pattern for recording servo data on a plurality of disc tracks in accordance with the invention.

FIG. 4 is a series of graphs illustrating the detected signals and corresponding decoded values obtained in response to the servo data encoding pattern of FIG. 3.

FIG. 5 illustrates the basic servo encoding pattern employed for the cells of a single servo track.

FIG. 6 is a table illustrating the encoded and decoded values corresponding to various track locations of a head.

FIG. 7 is an electrical block diagram illustrating a preferred embodiment of the coarse servo detector in FIG. 2.

FIG. 8 is a flow chart illustrating the operation of the coarse servo detector of FIG. 7.

FIG. 9 is a table illustrating a specific example of a coarse positioning operation in accordance with the invention.

DESCRIPTION OF THE PREFERRED EMBODIMENTS

Like characters and numerals correspond to like elements throughout the figures of the drawings.

Figure 1:
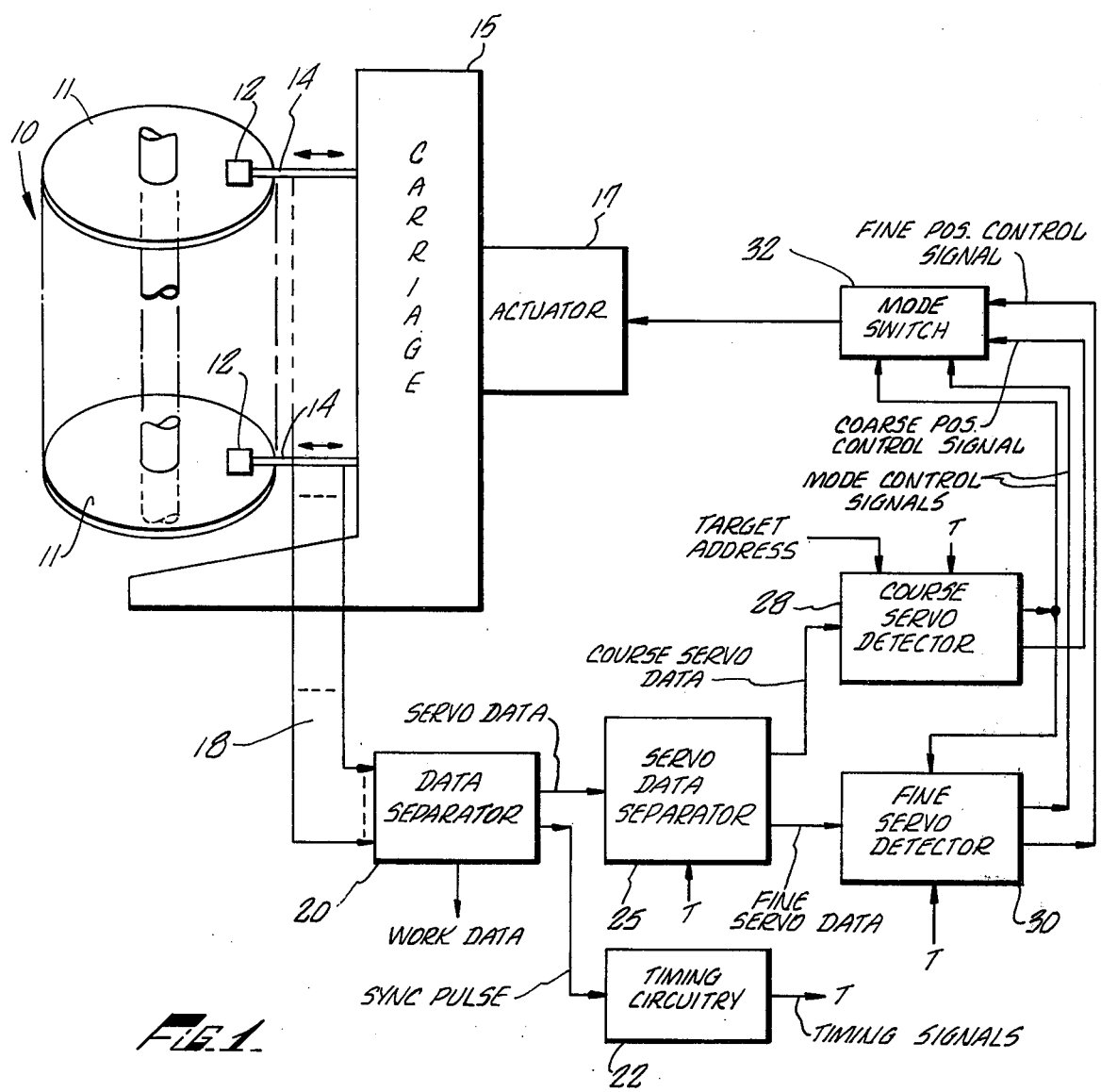
FIG. 1 is a schematic and block diagram of a magnetic disc recording and reproducing system to which the present invention may be applied.
Figure 2:
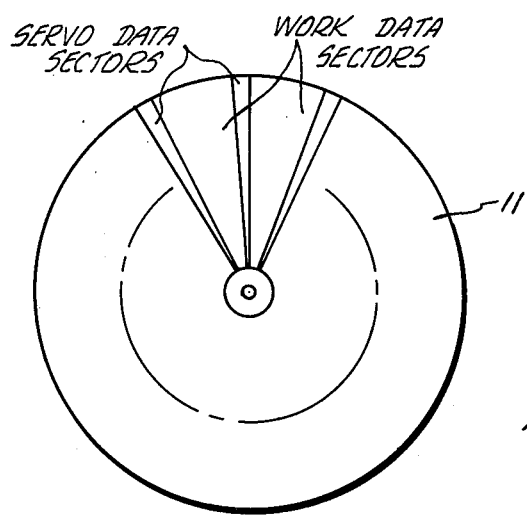
FIG. 2 illustrates an interspersed arrangement of servo data and work data on a disc.

Referring initially to FIG. 1, illustrated therein is a conventional arrangement of a typical known type of disc recording and reproducing system comprising a disc pack 10 containing a plurality of rotatable discs 10 with a respective, radially positionable read/write magnetic transducer head 12 being provided for cooperation with each disc. Each disc 10 contains a plurality of concentric annular tracks. As illustrated in FIG. 2, work data and servo data are interspersed on the disc so as to form alternating work data sectors and servo data sectors. The servo data on each disc is provided to control the radial positioning of the respective disc head 12 in order to permit accessing selected work data tracks for reading and/or writing, such as, for example, is conventionally performed when a disc system is employed as a peripheral storage unit in a computer system. For the purposes of this description it may be assumed that all of the heads are constructed and arranged to move together, but it is to be understood that the present invention would also be applicable to a disc system in which the heads are individually movable. It will also be assumed that only one head and a corresponding disc is selected for reading and/or writing at a time.

Still with reference to FIG. 1, it will be understood that, in a conventional manner, a head positioning carriage 15 controlled by an actuator 17 provides for radial positioning of the heads 11. The actuator 17 is in turn controlled in response to a positioning control signal derived in response to the current position of the head relative to the desired position. More specifically, as schematically illustrated in FIG. 1, data signals read from a disc 11 by a selected head 12 are applied via lines 18 to a data separator 20 (which may be of conventional form) for separating servo and work data based on sector location, and for providing a sync signal reference sector locations on the disc. The sync signal is applied to timing circuitry 22 for producing a group of timing signals T in a conventional manner for application to other elements of the system.

As will hereinafter be considered in detail, in connection with FIGS. 3 and 4, the servo data recorded in each servo track of a servo data sector comprises a common reference transition followed by a first group of servo data signals constituting fine positioning servo data and a second group of servo data signals constituting coarse positioning servo data. Accordingly, the servo data provided by the data separator 20 includes both coarse servo data and fine servo data. The servo data provided by the data separator 20 is thus applied to a servo data separator 25 for separating the coarse and fine positioning data and for applying the resulting separated coarse positioning and fine positioning servo data signals to a coarse servo detector 28 and a fine servo detector 30, respectively. Because the fine and coarse servo data occupy different discrete portions of a servo data track, the servo data separator 25 may typically comprise conventional gating circuitry responsive to appropriate timing signals T for providing separation of the detected coarse and fine servo data based on the time spacing therebetween.

When the position of a head 12 is to be changed from one work data track to another work data track in the preferred embodiment being considered herein, the coarse servo detector 28 operates in response to an applied target address and to the detected coarse servo data provided by the servo data separator 28 to bring the head 12 into approximate alignment with the work data track corresponding to the target address. More specifically, the coarse servo detector 28 accomplishes coarse positioning (also called track seeking) by employing the coarse servo data read from the current track in conjunction with the target address to produce a coarse position control signal which is applied via a mode control switch 32 to the actuator 17 for appropriately controlling the head positioning carriage 15. When the coarse servo detector detects that the head has been brought into approximate registration with the target track, a mode control signal is produced which, as indicated in FIG. 1, activates the fine servo detector 30 while also switching the mode switch 32 to now apply to the actuator 17 the fine position control signal produced by the activated fine servo detector 30. The fine servo detector 30 may be of a well known type, such as disclosed, for example, in FIG. 6 of the aforementioned Mueller U.S. Pat. No. 3,691,543. The fine servo detector 30 operates in response to the fine positioning data provided by the servo data separator 25 in FIG. 1 hereof to cause the head 12 to move into accurate alignment with the target address track to which it has been approximately positioned by the coarse servo detector 28, and to maintain this accurate alignment until repositioned to a new target track. A preferred embodiment of the coarse servo detector 28 in accordance with the invention is illustrated in FIG. 4 and will be considered in detail after first considering a preferred form of the novel servo encoding pattern of the invention with reference to FIGS. 3 and 4.

Accordingly, referring next to FIG. 3, it will be understood that FIG. 3 illustrates a preferred arrangement of the servo encoding pattern to be provided on each servo sector of a disc for a representative plurality of servo tracks $n$, $n+1$, $n+2$, etc. in accordance with the invention. FIG. 4 illustrates typical fine and coarse servo signals which will be detected by a recording head in response to the servo encoding pattern of FIG. 3. For example, the first graph in FIG. 4 designated n illustrates the detected sync and fine and coarse servo signals obtained when a head is centered over servo track n in FIG. 3, while the second graph in FIG. 4 illustrates the detected sync and fine and coarse servo signals obtained when the head is positioned half-way between servo tracks $n$ and $n+1$ in FIG. 3. The remaining graphs in FIG. 4 are to be interpreted in a similar manner. Typical work data tracks $d$, $d+1$, $d+2$, etc. are illustrated at the right in FIG. 3 and, as is conventional, are located on the disc so that their center lines are in alignment with the boundary lines of the servo tracks.

Initially, the description of FIGS. 3 and 4 will be primarily concerned with the coarse positioning servo data patterns illustrated therein which are representative of a preferred form of coarse servo encoding pattern for use in providing improved coarse positioning of a head in accordance with the invention. For easier understanding, the basis of the coarse encoding pattern employed in the preferred embodiment of the invention will first be considered with reference to FIG. 5 for the single representative track n+1. The arrows in FIG. 5 (and also in FIG. 3) schematically indicate the magnetic polarity of the magnetization on each side of a magnetic transition which is indicated by a vertical line. Three coarse servo data cells A, B and C are illustrated in FIG. 5. Each cell stores a single binary digit, 0 or 1, dependent upon whether a transition occurs in a first or second location within the cell, each cell containing only one transition. Preferably, as illustrated in FIG. 5, a transition is centrally located in either the first or second half of a cell. The encoding scheme is such that the occurrence of a transition in the first half of a cell, as in cell C, represents the storage of a binary 1 by the cell, while the occurrence of a transition in the second half of a cell, as in cells A and B, represents a binary 0. Thus, the cells A, B, C in FIG. 5 together represent the binary number 001. FIG. 5 also illustrates typical detected pulses which will be produced by a head in response to reading the transitions in cells A, B and C. It will thus be understood that the number of tracks which may be uniquely identified by the coarse servo encoding pattern illustrated in FIGS. 3 and 5 is $2^N$, where N is the number of cells employed. Since three cells A, B and C are employed in the preferred embodiment, N=3, and $2^N=8$, so that each of the eight adjacent tracks n through n+7 illustrated in FIG. 3 may be uniquely identified. The compactness of this encoding approach will be appreciated by noting that the addition of only one more cell to provide a total of four cells would make it possible to uniquely identify $2^4$ or 16 tracks, while a total of five cells would make it possible to uniquely identify $2^5$ or 32 tracks. For reasons which will hereinafter become evident, the number of uniquely identifiable tracks provided in a group is chosen in conjunction with the maximum velocity of radial head movement so that radial head movement between servo sectors is less than the number of uniquely identifiable tacks contained in a group, thereby insuring that the detection of coarse servo data between sectors will not provide ambiguous track identification. For example, since the preferred embodiment described herein employs eight uniquely identifiable tracks in each group, radial head movement between sectors should be less than eight tracks.

A particularly important aspect of the coarse servo encoding pattern of the present invention is concerned with the choice of the particular sequence which is employed for the tracks of each predetermined group of uniquely identifiable servo tracks. A primary consideration in making this choice is based on the goal of providing a sequence which will permit the compactly recorded coarse servo data cells in each track to provide a reliable and continuous determination of the track position of a head during a coarse positioning operation. As will shortly be considered in more detail, this goal is advantageously achieved in accordance with a preferred embodiment of the invention by employing a Gray code sequence for encoding the coarse servo data cells of the tracks in each uniquely identifiable group of eight servo tracks, such as illustrated for the eight servo tracks $n$ to $n+7$ in FIG. 3. It will be understood that this same Gray code coarse servo encoding sequence is cyclically repeated for like groups of eight adjacent servo tracks over the entire usable disc surface.

A Gray code sequence is well known to have the characteristic that adjacent numbers in the sequence differ from each other in only one bit position; in other words, in a Gray code sequence, only one bit position is changed as the sequence advances from one number to the next. The specific Gray code sequence employed for the servo tracks $n$ to $n+7$ in FIG. 3 is illustrated by the encode portion of the table shown in FIG. 6 which also shows the equivalent binary code form of the coarse servo data which may be converted into Gray code in a conventional manner in order to record the coarse servo data on the disc. An important advantage of the Gray code sequence employed for the servo tracks $n$ to $n+7$ in the preferred form illustrated in FIG. 3 is that, as the head is moved from one servo track to an adjacent servo track, the detected signal will change for only one cell position, the detected signals for the other cell positions remaining the same regardless of whether the head is located over either one of the adjacent tracks or at any intermediate position therebetween. This characteristic of the Gray code coarse servo encoding sequence is apparent from the detected coarse servo signals illustrated in FIG. 4, and is also apparent from the coarse servo data portion of FIG. 3 which shows that the transition location of only one cell changes between adjacent tracks, the transitions of the other cells remaining the same and extending in an uninterrupted line between each pair of adjacent tracks. For example, it will be noted in FIGS. 3 and 4 that when a head moves from servo track n to servo track $n+1$, the transition locations in both of cells A and B remain the same whether the head is over either track or is located at any intermediate position between the tracks, the only change in transition position occurring for cell C.

Next to be considered with reference to FIG. 4 is the manner in which the detected coarse servo signals obtained from the coarse servo encoding pattern illustrated in FIG. 3 are decoded to provide head position information with respect to the representative group of eight servo tracks $n$ to $n+1$ employed in the preferred embodiment. For this purpose, attention is directed to the Detected Coarse Servo and Binary Code Conversion values indicated at the right in FIG. 4 and located adjacent the respective signal waveforms to which they correspond. These same values are also provided in the Decode portion of FIG. 6 for ready comparison with the encoded Binary Code and Gray Code Conversion values. It will be evident from FIG. 4 that the Detected Coarse Servo values are based on assigning either a 0, 1, or "T" value to each cell: a 0 value is assigned to a cell when a detected pulse occurs only in the second half of the cell, a 1 value is assigned to a cell when a detected pulse occurs only in the first half of the cell, and a T value is assigned to a cell when pulses occur in both the first and second halves of a cell, such as when a head is between tracks and is located at a cell position whose transition position is changed between the two tracks. It will thus be recognized that the coarse servo encoding pattern of FIG. 3 merely requires the detection of the presence or absence of pulses at the cell transition locations in order to derive the 0, 1 and T values, thereby permitting the coarse servo data to be compactly provided on the servo track.

As indicated by the Binary Code Conversion values in FIG. 4 and the Decode portion of FIG. 6, the Detected Coarse Servo values 0, 1 and T may readily be converted into a conventional binary code to permit determination of head position during coarse positioning of a head using known types of logical circuit components. In this regard, it is to be noted in FIGS. 4 and 6 that, for greater circuit economy, the decoded binary values are chosen so that when a head is between tracks it has the same binary values as those obtained for the immediately preceding track. For example, as illustrated in FIG. 4, when a head is between tracks $n$ and $n+1$, the resulting detected binary code will be 000, which is the same binary code obtained when the head is over track $n$. It will be apparent that, if desired, the detected coarse servo values illustrated in FIGS. 4 and 6 could be used directly for coarse positioning without being converted to a conventional binary code.

Attention is now directed to FIG. 7 which illustrates a preferred embodiment of the coarse servo detector 30 of FIG. 1. As mentioned earlier herein, the coarse servo detector 30 is responsive to the detected coarse servo data and an applied target address for producing a coarse positioning control signal which is applied via a mode switch 32 (FIG. 1) to the carriage actuator 17 for bringing a selected head into approximate alignment with the data track corresponding to the target address. As illustrated in FIG. 7, the current work data track address of a selected disc head may be obtained in a conventional manner from a current address register 35. When the head is to be moved to a new work data track position, the new work data track address, commonly referred to as the target address, is set up in a target address register 37. A subtractor 40 compares the addresses in the current and target address registers 35 and 37 and sets up the difference in a difference counter 45. The count of the difference counter 45 is applied to a digital-to-analog converter 47 along with a direction signal from the subtractor 40. The difference counter 45 also applies a mode control signal to the mode switch 32 to switch it to the coarse positioning mode so as to thereby permit the digital-to-analog converter 47 to provide an appropriate coarse position control signal to the carriage actuator 17 (FIG. 1) to initiate movement of the head in a direction towards the target track.

It is to be understood that the construction and operation of the current and target address registers 35 and 37, the subtractor 40, the difference counter 45 and the digital-to-analog converter 47 may be provided in a conventional manner. The remaining portions of the coarse servo detector 28 of FIG. 7 illustrate additional implementation provided to advantageously utilize the preferred coarse servo encoding pattern illustrated in FIG. 3 for coarse positioning the head in registration with the target address track. The flow chart of FIG. 8 will be employed along with FIG. 7 to describe this additional implementation.

Accordingly, referring to FIG. 8 along with FIG. 7, it is to be understood that the flow chart in FIG. 8 represents the operations performed by the coarse servo detector 28 as a result of the head traversing a typical servo data sector (FIG. 2), all servo operations for the sector being completed before the head intercepts the next servo sector. Servo operations for each servo sector are initiated in response to the sync pulse detected at the beginning of each servo sector. The detection of the sync pulse (block 60 in FIG. 8) causes the detected coarse servo data corresponding to the current head location to be converted into its equivalent binary form by the decoder 50, and then loaded into the coarse servo register 52 (block 62 in FIG. 8). The decoder 50 may readily be designed in a conventional manner to provide the appropriate decoding illustrated in the Decode portion of FIG. 6. The resulting servo track identifying data A provided by the coarse servo register 52 is applied to a comparator 54 for comparison (block 64 in FIG. 8) with the servo track data B provided by a comparison counter 56 having a count corresponding to the current servo track position of the head at the time that the coarse positioning operation is initiated. If A ≠ B during this first comparison (block 66 in FIG. 8), it is an indication that the carriage 15 (FIG. 1) has moved the head across at least one servo track from its track position in the previous servo sector. In such a case, the comparator 54 provides an output signal which decrements the difference counter 45 by one count and advances the comparison counter 56 by one count in the direction indicated by the direction signal provided by the substractor 40 (block 67 in FIG. 8). In summary, therefore, what has occurred is that, as a result of determining that A ≠ B, three functions are performed: (1) the comparison counter 56 is advanced one count to correspond to the next adjacent servo track in the direction of radial head movement, (2) the count of the difference counter 45 (which contains a count representing the total number of servo tracks that the head must cross in order to reach the target track) is decremented by one count, and (3) the comparator 54 is caused to perform a second comparison (line 68 in FIG. 8) of A with the updated value of B. If the head has moved across only one servo track from its position in the previous sector, the condition A = B will now exist and operations for the sector will be permitted to terminate after determining (block 70 in FIG. 8) whether the difference counter 45 has been decremented to zero during the sector indicative of arrival of the head at the target track.

If, however, the condition A ≠ B is still detected by the second comparison, it is an indication that the head has crossed more than one servo track from the previous sector. In such a case, the difference counter 45 is again decremented by one count, the comparison counter 56 is again advanced by one count in the direction of radial head movement to correspond to the next adjacent servo track (that is, two servo tracks from the track position indicated by the comparison counter 56 at the beginning of the sector), and a third comparison by the comparator 54 will then occur. It will be understood that the condition A = B will be met on this third comparison if the head has crossed two servo tracks from its position in the previous sector. If not, one or more additional comparison cycles as described above will be performed until the comparison counter 56 is advanced a sufficient number of times to provide an A = B comparison condition. Since the difference counter 45 is decremented each time an A ≠ B comparison occurs during servo operations in a servo sector, the difference counter 45 will correctly indicate, at the termination of the servo operations for each sector, the number of servo tracks remaining for the head to cross in order to arrive at the target track. If the difference counter 45 has been reduced to a zero count during operations in a servo sector (block 70 in FIG. 8), as detected by a zero count detector 58 in FIG. 7, it is an indication that the head has arrived at the target track. Operation then switches to the fine positioning mode as a result of the zero count detector 58 applying an appropriate mode control signal to the fine servo detector 30 and to the mode switch 32 as illustrated in FIG. 1.

If, however, the difference counter is not zero when the A = B condition is reached for a servo data sector, then the coarse positioning operation does not terminate, but will repeat (line 71 in FIG. 8) the same series of operations as described above for the next servo sector and for each successive sector thereafter, until the difference counter 45 has been reduced to zero. Thus, the coarse positioning operation described above repeats in a like manner for each servo sector traversed by the head until the difference counter 45 has been reduced to zero to thereby indicate that the head has arrived at the target track. In this regard, it will be appreciated that the digital-to-analog converter 47 in FIG. 7 is designed in a conventional manner to respond to the decreasing count of the difference counter 45 occurring during coarse positioning operations so as to provide an appropriate velocity characteristic for moving the head towards the target track with an appropriate initial acceleration followed by deceleration to a lower speed as the target track is approached so that the head will not overshoot the target track. In the preferred embodiment being considered herein, the coarse positioning operations position the head to within about ± ½ track of the target track, which is within the capture range of conventional fine positioning systems, such as illustrated in the aforementioned Mueller U.S. Pat. No. 3,691,543.

A specific illustrative example of a typical coarse positioning operation employing the preferred embodiment described herein will now be described with particular reference to FIG. 9 along with FIGS. 7 and 8. It will be assumed that a selected head is currently following work data track d in FIG. 3 which for this example will be designated as track 96. It will further be assumed that the head is to be repositioned by the coarse servo detector 28 to within ± ½ track of a target address placed in the target address register 37 in FIG. 7 corresponding to work data track $d+8$ in FIG. 3. Since work data track $d+8$ is eight tracks away from work data track d, it will be designated as track 104. From the previous consideration of FIG. 7, it will be understood that the coarse positioning operation begins with the subtractor 40 taking the difference between the current and target addresses in the current and target address registers 35 and 37. The subtractor 40 then sets the difference counter 45 to a count corresponding thereto, which in this case will be 8. The subtractor 40 also provides a positive direction signal to the digital-to-analog converter 47 and the comparison counter 56 to indicate that the head is to be moved in a radial direction corresponding to increasing track address numbers. The digital-to-analog converter 37 will then provide an appropriate initial coarse positioning control signal to the actuator 17 (FIG. 1) so that the head will begin to move in the desired radial direction.

With reference to FIG. 9, it will be assumed that the first servo sector intercepted by the head following initiation of the coarse positioning operation is servo sector $S_1$, at which time the head will be assumed to be positioned over the boundary between servo tracks $n$ and $n+1$ corresponding to work data track $d$, which is track 96 in this example. The coarse servo register output A obtained during sector $S_1$ will be assumed to be 000. The comparison counter output B will then also be 000, since it will have a count corresponding to the initial head position at the start of the coarse positioning operation. The comparator 54 will thus detect an A = B condition during the first comparison time period $t_1$ of sector $S_1$. Accordingly, there will be no decrementing of the difference counter 45 or advancement of the comparison counter 56 during $t_1$ of servo sector $S_1$, and they will remain at their existing counts of 8 and 000 respectively. Since the A = B condition was achieved during $t_1$, there is no need to cycle to any additional time periods during sector $S_1$. Also, since the difference counter 55 is not zero at the completion of servo operations for sector $S_1$, the coarse positioning operation recycles (line 71 in FIG. 8) to await interception of the next servo sector $S_2$ by the head.

Still with reference to FIG. 9, it is assumed that when the next servo sector $S_2$ is intercepted, the head will have moved so that it is now centered over servo track $n+1$ producing a detected coarse servo register output A = 001. Since the comparison counter output B is still 000, an A ≠ B condition occurs. A 1 output is thus produced by the comparator 54, causing the difference counter 45 to be decremented from 8 to 7 and the comparison counter 56 to be updated from B = 000 to B = 001. Since the condition A ≠ B occured during $t_1$ of sector $S_2$, servo operations for sector $S_2$ recycle to provide a second comparison of A = 001 with the updated value B = 001 during a second time period $t_2$ of sector $S_2$. Since an A = B comparison condition is obtained during $t_2$ of servo sector $S_2$, servo operations for sector $S_2$ terminate after $t_2$. The difference counter 45 will thus have been decremented one count from 8 to 7 during sector $S_2$, indicating the head still has to cross seven more servo tracks in order to arrive at the target address track.

Since radial head movement typically starts off slowly and then picks up speed, when the next sector $S_3$ is intercepted, the head may typically have moved so as to now be positioned over the boundary between servo tracks $n+3$ and $n+4$ corresponding to work data track $d+3$ which is track 99 in this example. The coarse servo register 52 thus provides an A = 011 output. Since the output of the comparator counter 56 will be at the B = 001 value existing at the end of sector $S_2$, an A ≠ B comparison results during $t_1$ of sector $S_3$. Accordingly, the resulting 1 output of the comparator 54 causes the difference counter 45 to be decremented from 7 to 6 during $t_1$ of sector $S_3$ and the comparison counter 56 to be advanced from B = 001 to B = 010. Servo operations then recycle to perform a second comparison during time period $t_2$ of sector $S_3$ between the updated B = 010 value of comparison counter 56 and the A = 011 value of the servo coarse register 52.

Since an A ≠ B condition again occurs during $t_2$, the difference counter 45 is again decremented, this time from 6 to 5, and the comparison counter 56 is again advanced, this time from B = 010 to B = 011. Servo operations during sector $S_3$ then recycle to a third time period $t_3$ for the performance of a third comparison of A = 011 with the updated value of B = 011 which now produces an A = B condition.

It will be apparent from the foregoing that the number of time periods $t_1$, $t_2$, $t_3$, etc. performed during a sector is equal to the number of comparisons required to achieve an A = B condition. Since no change in either the difference counter 45 or the comparison counter occurs in response to the A = B condition, the number of counts by which the difference counter 45 is decremented and the comparison counter 56 advanced during a servo sector is one less than the number of comparisons performed, and thus one less than the number of time periods $t_1$, $t_2$, $t_3$ required during a sector in order to achieve an A = B comparison condition. Since in this preferred embodiment, eight uniquely identifiable servo tracks are provided in each group, the head position can be assumed to be controlled to change by less than eight servo tracks between sectors so that there is no ambiguity in the head position indicated by the coarse servo register 52. Thus, in the preferred embodiment being considered herein, a maximum of eight time periods $t_1$, $t_2 \ldots t_8$ can occur during a servo sector depending on how many servo tracks the head has crossed since the previous servo sector.

Continuing with the specific example being considered, it will be noted in FIG. 9 that, during the next servo sector $S_4$, it is assumed that the head has moved so as to now be positioned between tracks $n+5$ and $n+6$ corresponding to work data track $d+5$, which is track 101 in this example. Three comparisons occuring during the respective time periods $t_1$, $t_2$ and $t_3$ of sector $S_4$ will thus be required in order to advance the comparison counter two counts from B = 011 to B = 101 so as to thereby be equal to the A = 101 value of the coarse servo register 52 which is detected for the $n+5/n+6$ track position. As a result of the two A ≠ B comparisons obtained during $t_1$ and $t_2$ of servo sector $S_4$, the difference counter 45 is decremented from 5 to 3 to indicate that the head must still cross three servo tracks in order to reach the target track $d+8 = 108$.

When the next sector $S_5$ is intercepted, it is assumed that the head has now moved to a position over servo track $n+7$ as indicated in FIG. 9. It will thus be understood that, as was the case for sectors $S_3$ and $S_4$, sector $S_5$ will require three comparisons during respective time periods $t_1$, $t_2$ and $t_3$ to advance the comparison counter 56 two counts from B = 101 to B = 111 so as to be equal to the detected A = 111 value for $n+7$, and thereby produce an A = B comparison condition. The difference counter 45 is thus decremented by two more counts during sector $S_5$ from 3 to 1 to indicate that the head still has to cross one more servo track in order to reach the target track $d+8 = 104$.

As illustrated in FIG. 9, when the next sector $S_6$ is intercepted, it is assumed that the head has moved so as to now be positioned over the boundary between servo tracks $n'$ and $n'+1$ corresponding to work data track $d+8$, which is the target track 104 in this example. As indicated in FIG. 9, a detected value of A = 000 is obtained for $n'/n'+1$ which when compared with the B = 111 value produces an A ≠ B comparison condition during time period $t_1$ of sector $S_6$, causing advancement of the output of the comparison counter 56 from B = 111 to B = 000 and decrementing of the difference counter 45 from 1 to 0. During the next time period $t_1$ of sector $S_6$, and A = B comparison condition will thus be obtained to terminate servo operations for sector $S_6$. Because the difference counter 45 has been decremented to a zero count during sector $S_6$, a mode control signal is applied to the fine servo detector 30 and to the mode switch 32 in FIG. 1 to activate fine positioning operations which precisely align the head with the target track to which it has been coarsely positioned by the above described coarse servo positioning operations.

Although the foregoing example of typical coarse positioning operations in accordance with the invention required that the head be radially moved a distance of only eight tracks, it will be recognized that the preferred embodiment described above will permit the head to be positioned to any desired target track, regardless of how many servo track groups have to be crossed, by setting up the appropriate track difference number in the difference counter 45. During such operations, the comparison counter 56 will automatically recycle back to 000 corresponding to the first track of each group after reaching its eighth count 111 corresponding to the last track of each group, while the difference counter 45 will continue to be decremented to correspond to the correct current track position of the head regardless of how many servo track groups are crossed, so long as the previously mentioned restriction is met that the detected head position change by less than eight tracks between sectors, thereby preventing any possible ambiguity in determining servo track crossings.

As mentioned previously, the fine servo detector 30 in FIG. 1 employs the fine servo data along with the sync transition provided at the beginning of each servo sector (FIG. 3) to bring and maintain the head in accurate registration with the target track to which it has been positioned as a result of the coarse positioning operations, such as typified in the above example. As also mentioned previously, the fine servo detector 30 may, for example, be constructed and arranged as described in connection with FIG. 6 of the aforementioned U.S. Pat. No. 3,691,543. The basic operations involved in this fine servo positioning approach and its advantageous employment with the present invention will now be considered.

It will be noted in FIG. 3 that the fine servo data is provided so that odd tracks $n$, $n+2$, $n+4$, etc. have a single transition of opposite polarity to the sync transition located in position No. 1, while even tracks $n+1$, $n+3$, $n+5$, etc. have a single transition of opposite polarity to the sync transition located in position No. 2. The detected fine servo signals illustrated in FIG. 4 are thus such that, following the positive sync pulse, a negative pulse is produced only in position No. 1 when the head is centered over an odd track, while a negative pulse is produced only in position No. 2 when the head is centered over an even track. When the head is located between tracks, reduced amplitude negative pulses are produced at both positions No. 1 and No. 2 following the positive sync pulse having relative amplitudes directly related to the position of the head with respect to the boundary between the two adjacent tracks. In FIG. 4, it is assumed that the waveforms illustrated for the between-track positions of the head correspond to the situation where the head is equally spaced between the two adjacent tracks, in which case, the reduced negative pulses in positions No. 1 and No. 2 have equal amplitudes as shown. It will thus be understood that the fine servo detector 30 in FIG. 1 employs the detected positive sync pulses illustrated in FIG. 4 to separate the detected fine servo pulses in positions No. 1 and No. 2 for amplitude comparison, the results of the amplitude comparison being employed to generate a fine positioning control signal which, as illustrated in FIG. 1, is applied via the mode switch 32 to the carriage actuator 17 for maintaining the head in accurate registration with the target track.

In the preferred head positioning embodiment being considered herein, track densities are chosen so that, once a head has been coarse positioned to a target track, system tolerances will be such that head position variations from one servo data sector (FIG. 2) to the next will be within the capture range of the fine servo detector 30 in FIG. 1. However, in those embodiments in which head movement between servo data sectors might extend beyond the reliable capture range of the fine servo detector 30, it is necessary to provide for this possibility. In accordance with the present invention, this additional capability may advantageously be provided using a relatively simple modification of the coarse servo detector 28 without the need to change either the fine servo or coarse servo data recorded in the tracks. In this connection, it will be appreciated that, because the fine positioning servo data of the type illustrated in FIG. 3 is known to require a relatively large separation between the transitions recorded at positions No. 1 and No. 2 in order to provide for accurate track following, it would not be an efficient use of recording medium storage space to increase the number of these fine servo transitions so as to provide a coding which will permit fine positioning among a plurality of tracks, such as described in connection with FIGS. 7-12 of the aforementioned Mueller U.S. Pat. No. 3,691,543, and as disclosed in the aforementioned Palmer U.S. Pat. No. 3,838,457.

Figure 10:
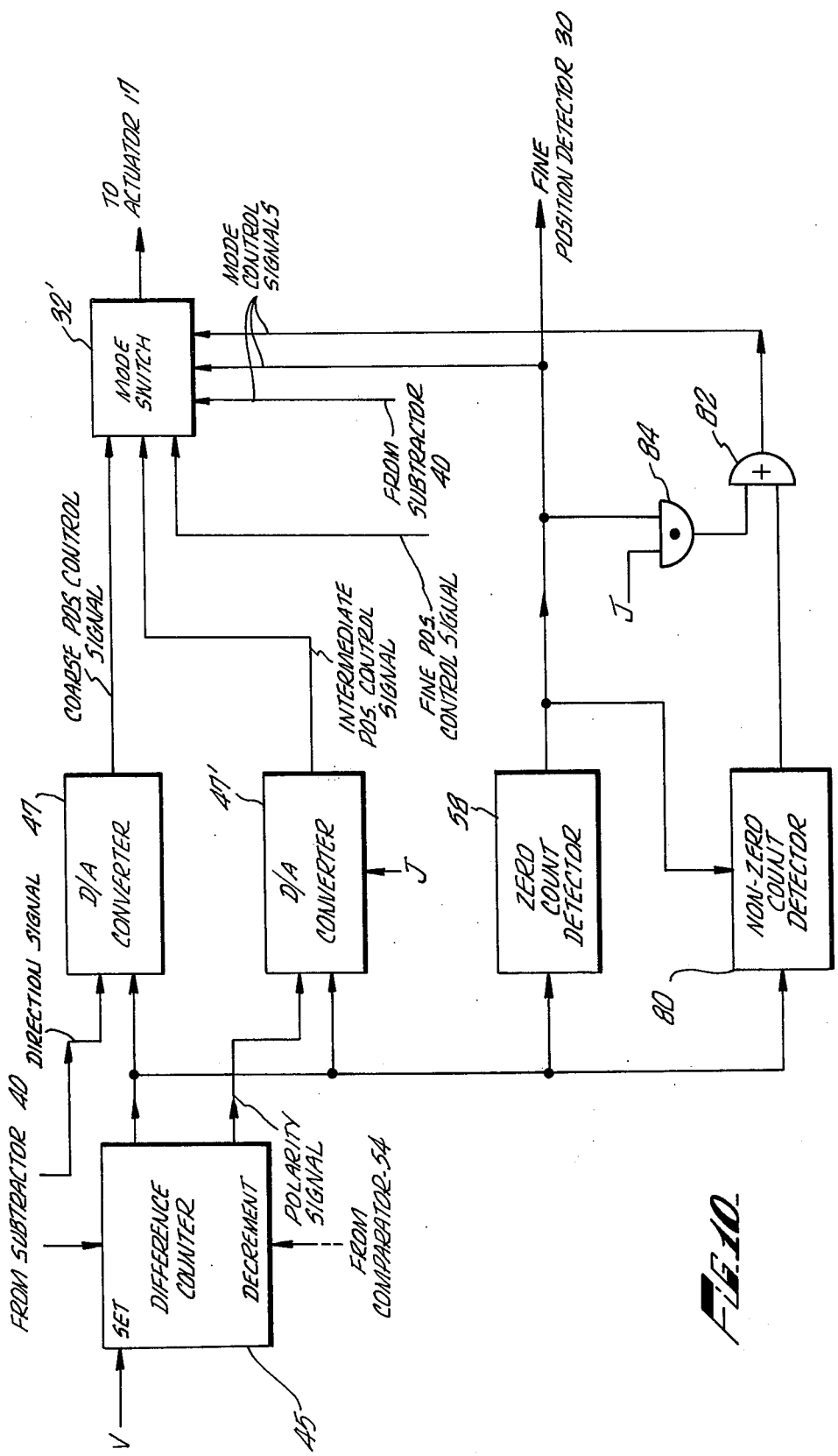
FIG. 10 is an electrical block diagram illustrating a modification of the coarse servo detector of FIG. 7 for providing an intermediate positioning capability.

FIG. 10 illustrates preferred modifications in accordance with the invention which may be made to the coarse servo detector 28 of FIG. 7 and the mode control switch 32 in FIG. 2 in order to provide an intermediate positioning capability for returning a head to the reliable capture range of the fine positioning detector 30 in the event that it has moved out of this range between servo sectors. It will be noted in FIG. 10 that a digital-to-analog converter 47', a non-zero count detector 80, an OR gate 82, and an AND gate 84 have been added, all of which may be of conventional form. Also, a modified mode switch 32' is provided to permit selectively applying any one of three position control signals — fine, coarse or intermediate — to the actuator 17 in response to respective mode control signals. The construction and operation of the modified embodiment illustrated in FIG. 10 is such that, when the zero count detector 58 detects a zero count of the difference counter 45, it activates the non-zero count detector 80 along with the fine servo detector 30 (FIG. 1), and also enables AND gate 84 to permit a signal J derived from the decoder 50 in FIG. 7 to be applied to OR gate 82 along with the output of the non-zero count detector 80. The non-zero detector 80 provides a true signal output whenever the difference counter 45 has a count other than zero, while the signal J provides a true output whenever a head is located over a servo track; in other words, when the head is not located between servo tracks. As will be apparent from FIG. 4 and the previous discussion herein, an appropriate signal J is readily derivable in a conventional manner from the detected coarse servo simply by providing appropriate logic for generating a true signal whenever the detected coarse servo data does not include a T value.

Continuing with the description of FIG. 10, it will be understood that, during fine positioning operations, so long as the difference counter 45 remains at zero and the signal J remains false, the output of OR gate 82 will be false and thereby permit the fine positioning control signal provided by the servo detector 30 to maintain the head in accurate registration with the target track. However, if during fine positioning operations, the signal J becomes true, or if the difference counter 45 is no longer zero, the output of OR gate 82 will then become true, indicating that the head has moved a distance of at least one-half track from the target track, which is assumed to be the reliable capture range of the fine position detector 30 for the purposes of this description. When OR gate 82 becomes true, it switches the mode switch 32' to the intermediate positioning mode to permit the intermediate position control signal provided by the digital-to-analog converter 47' to be applied to the actuator 17 instead of the fine positioning signal.

It will be understood that the digital-to-analog converter 47' in FIG. 10 is designed in a conventional manner to provide an appropriate intermediate position control signal tailored for movement over the relatively small distance required to return the head to the target track, the signal J and the output of the difference counter 45 being employed to indicate the current location of the head with respect to the target track. The difference counter 45 also provides a polarity signal to the digital-to-analog converter 47' to indicate whether the counter 45 has been counted up or down from its zero count, thereby indicating the direction in which the head has to be moved in order to return it to the assumed ± ½ track reliable capture range of the fine servo detector 30. This return is indicated by OR gate 82 becoming false again which causes the mode switch 32' to be switched back to the fine positioning mode.

It is further to be noted with regard to the modified embodiment illustrated in FIG. 10, that the additional intermediate positioning capability provided therein may also be advantageously employed for repositioning a head among a relatively small number of tracks, for example, plus or minus 4 tracks from the target track. Such a capability is advantageous in that it then becomes unnecessary to switch to the coarse positioning mode when the head is to be repositioned to a track only a short distance away. As is well known, a coarse positioning mode ordinarily is tailored to permit movement of the head over relatively large distances, and would therefore not be as fast or as efficient in positioning a head over a relatively small number of tracks, as would be possible using an intermediate positioning mode, such as provided in FIG. 10.

The specific manner in which FIG. 10 provides a short distance repositioning capability using the intermediate positioning mode will become evident by noting the use of a signal V during the fine positioning mode to set the difference counter 45 from its zero count to a new count indicative of the direction and number of tracks it is desired that the head be moved in order to be repositioned at a new target track located a short distance away. It will be understood that this setting of the difference counter 45 by the signal V will cause FIG. 10 to operate in the same manner as previously described for the situation where a head has strayed more than one-half track from the target track. The important difference, however, is that, after return to the fine positioning mode following completion of the intermediate positioning operations, the head will now be positioned over the corresponding new target track in accordance with the signal V.

It will be understood that the preferred embodiments described herein are only exemplary and that the invention is capable of many modifications and variations in construction, arrangement and use without departing from the spirit of the invention. For example, the positioning means and methods disclosed herein are also applicable to tape systems and the like, as well as to discs or drums. Also, the present invention is applicable for providing the positioning required in other forms of recording and/or reproducing systems, such as those in which data is recorded and reproduced optically.

The above examples of possible variations of the present invention are merely illustrative. Accordingly the present invention is to be considered as including all possible modifications and variations coming within the scope of the invention as defined by the appended claims.

What is claimed is:
1. A servo system for positioning a transducer means relative to a plurality of repeating groups of tracks provided at successive radial positions on a relatively moving recording medium, each group containing at least three tracks, said system comprising:
positioning means for moving said transducer means transversely relative to said tracks;
a plurality of servo data manifestations recorded in each track comprising a like located reference manifestation and spaced fine servo data manifestations and coarse servo data manifestations precisely located relative to said reference manifestation, said coarse servo data manifestations being recorded in each track so as to constitute a plurality of adjacent cells each having a manifestation at either a first or a second location of the cell indicative of either a first or second value for the cell, the cells and said first and second locations thereof being respectively aligned for all tracks of each group, the cells being encoded so as to provide;
a. a different identifying representation for each track of a group so that each track of the group is identifiable from the coding provided for its respective plurality of adjacent cells, and
b. an encoding sequence chosen for each group of tracks so that the value of only one cell is different on adjacent tracks, said fine servo data manifestations being recorded in each track so that traversal thereof by said transducer means produces detected signals indicative of the positioning of said transducer relative to two adjacent tracks;
first detecting means responsive to the detection by said transducer means of the differently encoded coarse servo data manifestations provided in each track of a group of tracks for controlling said posi- tioning means to provide for coarse positioning of said transducer means to a target track position; and second detecting means responsive to the detection by said transducer means of said fine servo data manifestations and operable upon completion of the coarse positioning of said transducer means by said first detecting means for controlling said positioning means so as to bring and maintain said transducer means in alignment with said target track position.

2. The invention in accordance with claim 1, wherein said first detecting means includes:
first means providing an output indicative of the distance between the current track position of said transducer means and said target track position; and
second means for updating said first means in accordance with the detected radial movement of said transducer means.

3. The invention in accordance with claim 1, wherein said second detecting means is activated in response to the output of said first means indicating that said transducer means has been coarse positioned to said target track position.

4. The invention in accordance with claim 1, wherein said recording medium is magnetic, wherein said transducer means is a magnetic head, and wherein said servo data manifestations are provided as magnetic transistions on said medium.

5. The invention in accordance with claim 4, wherein said first detecting means includes means responsive to the reading of said magnetic transitions by said magnetic head for producing for each cell traversed by said head: (a) a single electrical signal at a time corresponding to either said first or second location of a cell when said transducer means is approximately centered over a track, and (b) two electrical signals at times respectively corresponding to both of said first and second locations of a cell when said transducer means is between two adjacent tracks and is reading a cell whose value is different for the two adjacent tracks.

6. The invention in accordance with claim 4, wherein the fine servo mgnetic transitions provided in each track comprises a fine servo transition recorded at only a first location with respect to said reference transition for even tracks and at only a second location with respect to said reference transition for odd tracks, and wherein said second detecting means provides a fine positioning control signal to said control means indicative of the position of said transducer means relative to a pair of adjacent tracks by comparing the amplitudes of the signals detected by said transducer means in response to said fine servo transitions at said first and second locations of said adjacent tracks.

7. The invention in accordance with claim 6, wherein said recording medium includes a rotatable disc in transducing relationship to said magnetic head, wherein said tracks are concentrically located on said disc, and wherein said positioning means is adapted to provide for radial movement of said head.

8. The invention in accordance with claim 7, wherein said servo data transitions are provided in servo data tracks located in predetermined spaced servo data sectors of said disc.

9. The invention in accordance with claim 8, wherein work data is recorded on and reproduced from work data tracks in work data sectors located between said servo data sectors on said disc.

10. The invention in accordance with claim 9, wherein the number of servo data tracks provided in each group is chosen to be greater than the maximum radial movement of said magnetic head between servo sectors.

11. The invention in accordance with claim 10, wherein said first detecting means includes:
counting means providing a count indicative of the radial distance between the current track position of said magnetic head and a target track; and
means responsive to said electrical signals for determining current track position of said head relative to its respective group and for changing the count of said counting means in accordance with the radial distance that the head has moved since the previous servo sector.

12. The invention in accordance with claim 11, wherein additional means are provided operative after activation of said second detecting means and responsive to the servo data manifestations detected by said magnetic head for controlling said positioning means to return said magnetic heat to said target track in response to said counting means indicating that said head has moved a predetermined radial distance from the target track after having arrived at the target track.

13. The invention in accordance with claim 12, wherein further means are provided operative after activation of said second detecting means for setting said counting means to a count indicative of a new track position to which said head is to be repositioned.

14. A recording and reproducing medium for use in a servo system for positioning a relatively moving transducer means transversely with respect to a plurality of groups of tracks provided on said medium, each group containing at least three tracks,
each track having servo data manifestations comprising a like located reference manifestation and spaced fine servo data manifestations and coarse servo data manifestations precisely located relative to said reference manifestations;
said coarse servo data manifestations being recorded in each track so as to constitute a plurality of adjacent cells each having a manifestation at either a first or a second location of the cell indicative of either a first or a second value for the cell, the cells and said first and second locations thereof being respectively aligned for all tracks of each group, the cells of the tracks of each group being encoded so as to provide: (a) a different identifying representation for each track of a group so that each track of the group is identifiable from the coding provided for its respective plurality of adjacent cells, and (b) an encoding sequence for each group of tracks chosen so that the value of only one cell is different on adjacent tracks;
said fine servo data manifestations recorded in each track comprising a first fine servo manifestation provided at a first location with respect to said refrence manifestation for even tracks and at a second location with respect to said reference transistion for odd tracks.

15. The invention in accordance with claim 14, wherein said encoding sequence employs a Gray code.

16. The invention in accordance with claim 15, wherein said recording medium is a magnetic disc, wherein said tracks are concentrically located on said disc, and wherein each of said servo data manifestations is provided as a magnetic transition.

17. In a method for positioning a transducer means transversely relative to a plurality of groups of tracks provided at successive radial positions on a relatively moving recording medium, each group containing at least three tracks, the improvement comprising:

recording servo data manifestations in each track so as to provide a like located reference manifestation and spaced fine servo data manifestations and coarse servo data manifestations precisely located relative to said reference manifestation, said coarse servo data manifestations being recorded in each track so as to constitute a plurality of adjacent cells each having a manifestation at either a first or a second location of the cell indicative of either a first or second value for the cell, the cells and said first and second locations thereof being respectively aligned for all tracks of each group, the cells being encoded so as to provide (a) a different identifying representation for each track of a group so that each track of the group is identifiable from the coding provided for its respective plurality of adjacent cells, and (b) an encoding sequence chosen for each group of tracks so that the value of only one cell is different on adjacent tracks, said fine servo data manifestations recorded in each track comprising a manifestation provided at a first location with respect to said reference manifestation for even tracks and at a second location with respect to said reference transition for odd tracks.

18. The invention in accordance with claim 17, wherein said recording medium is magnetic, and wherein said servo data manifestations are recorded in said medium as magnetic transitions.

19. The invention in accordance with claim 18, wherein work data and servo data are recorded in alternate sectors of said magnetic disc.

20. In a method for positioning a magnetic transducer means transversely relative to a plurality of concentric tracks provided on a rotatable magnetic disc, the improvement comprising:

recording work data and servo data in alternate sectors of a magnetic disc, said servo data recorded in each track comprising a like located reference manifestation and spaced fine servo data manifestations and coarse servo data manifestations precisely located relative to said reference manifestation, said coarse servo data manifestations being recorded in each track so as to constitute a plurality of adjacent cells each having a manifestation at either a first or a second location of the cell indicative of either a first or second value for the cell, the cells and said first and second locations thereof being respectively aligned for all tracks of each group, the cells being encoded so as to provide: (a) a different identifying representation for each track of a group so that each track of the group if identifiable from the coding provided for its respective plurality of adjacent cells, and (b) an encoding sequence chosen for each group of tracks so that the value of only one cell is different on adjacent tracks, said fine servo data manifestations recorded in each track comprising a first manifestation provided at a first location with respect to said reference manifestation for even tracks and at a second location with respect to said reference transition for odd tracks;

providing an indication of the number of tracks and direction that said transducer means is to be moved from its current track position to a target track position;

moving said transducer means in said direction towards said target track;

detecting during said moving the current track position of said transducer means by detecting the coarse servo magnetic transitions traversed thereby during a servo sector, the number of servo tracks provided in each group being chosen greater than the maximum radial movement of said transducer means between servo sectors;

updating said indication during each sector based on the difference between the current detected position of said transducer means and that detected during the previous servo sector;

determining arrival of said transducer means at said target track position in response to said indication;

detecting said fine servo transitions after arrival of said transducer means at said target track position; and moving said transducer means in response to the detecting of said fine servo transitions to precisely position and maintain said transducer means in alignment with said target track position.

21. A servo system for positioning a transducer means relative to a group of at least three tracks provided on a relatively moving recording medium, said system comprising:

positioning means for moving said transducer means transversely relative to said tracks;

a plurality of servo data manifestations recorded in each track comprising a like located reference manifestation and spaced fine servo data manifestations and coarse servo data manifestations precisely located relative to said reference manifestation, said coarse servo data manifestations being recorded in each track so as to constitute a plurality of adjacent cells each having either a first or second value, the cells being respectively aligned for all tracks of each group and being encoded so as to provide:

a. a different identifying representation for each track of a group so that each track of the group is identifiable from the coding provided for its respective plurality of adjacent cells; and b. an encoding sequence chosen for each group of tracks so that the value of only one cell is different on adjacent tracks, said fine servo data manifestations being recorded in each track so that traversal thereof by said transducer means produces detected signals indicative of the positioning of said transducer relative to two adjacent tracks;

first detecting means responsive to the detection by said transducer means of the differently encoded coarse servo data manifestations provided in each track of said group of tracks for controlling said positioning means to provide for coarse positioning of said transducer means to a target track position; and second detecting means responsive to the detection by said transducer means of said fine servo data manifestations and operable upon completion of the coarse positioning of said transducer means by said first detecting means for controlling said positioning means so as to bring and maintain said transducer means in alignment with said target track position.

22. A recording and reproducing medium for use in a servo system for positioning a relatively moving transducer means transversely with respect to a plurality of groups of tracks provided at successive radial positions on said medium, each track having servo data manifestations comprising a like located reference manifestation and spaced fine servo data manifestations and coarse servo data manifestations precisely located relative to said reference manifestation;

said coarse servo data manifestations being recorded in each track so as to constitute a plurality of adjacent cells each having either a first or a second value, the cells of the tracks of each group being encoded so as to provide:
  a. a different identifying representation for each track of a group so that each track of the group is identifiable from the coding provided for its respective plurality of adjacent cells, and
  b. encoding sequence for each group of tracks chosen so that the value of only one cell is different on adjacent tracks;

said fine servo data manifestations recorded in each track comprising a first fine servo manifestation provided at a first location with respect to said reference manifestation for even tracks and at a second location with respect to said referene transition for odd tracks.

23. In a method for positioning a transducer means transversely relative to a plurality of groups of tracks provided on a relatively moving recording medium, the improvement comprising:

recording servo data manifestations in each track so as to provide a like located reference manifestation and spaced fine servo data manifestations and coarse servo data manifestations precisely located relative to said reference manifestation, said coarse servo data manifestations being recorded in each track so as to constitute a plurality of adjacent cells each having either a first or second value, the cells being encoded so as to provide:
  a. a different identifying representation for each track of a group so that each track of the group is identifiable from the coding provided for its respective plurality of adjacent cells, and
  b. an encoding sequence chosen for each group of tracks so that the value of only one cell is different on adjacent tracks, said fine servo data manifestations recorded in each track comprising a manifestation provided at a first location with respect to said reference manifestation for even tracks and at a second location with respect to said reference transition for odd tracks.

* * * * *

UNITED STATES PATENT AND TRADEMARK OFFICE
CERTIFICATE OF CORRECTION

PATENT NO. : 4,032,984
DATED : June 28, 1977
INVENTOR(S) : Jon B. Kaser et al.

It is certified that error appears in the above-identified patent and that said Letters Patent are hereby corrected as shown below:

Col. 1, line 42, delete "a".
Col. 2, line 13, change "situatio" to --situation--.
   line 28, change "duel" to --dual--.
   line 60, change "from" to --form--.
Col. 5, line 1, change "reference" to --referencing--.
Col. 6, line 61, change "tacks" to --tracks--.
Col. 9, line 39, change "substractor" to --subtractor--.
Col. 11, line 30, change "55" to --45--.
   line 43, change "occured" to --occurred--.
Col. 17, line 44, change "mgnetic" to --magnetic--.
Col. 18, line 24, change "heat" to --head--.
   line 61, change "refrence" to --reference--.
Col. 19, line 58, change "if" to --is--.
Col. 21, line 22, after "b.", insert --an--.
Col. 22, line 1, change "referene" to --reference--.

Signed and Sealed this

Twentieth Day of September 1977

[SEAL]

Attest:

RUTH C. MASON
Attesting Officer

LUTRELLE F. PARKER
Acting Commissioner of Patents and Trademarks